United States Patent
Codilian et al.

(10) Patent No.: US 6,782,449 B1
(45) Date of Patent: Aug. 24, 2004

(54) ADAPTIVELY MODIFYING A READ CACHING ALGORITHM BASED UPON THE DETECTION OF A VIBRATION STATE WITHIN A ROTATING MEDIA STORAGE DEVICE

(75) Inventors: Raffi Codilian, Irvine, CA (US); Steven L. Webb, Lake Elsinore, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 148 days.

(21) Appl. No.: 10/160,752

(22) Filed: Jun. 1, 2002

(51) Int. Cl.[7] .............................................. G06F 12/00
(52) U.S. Cl. ....................... 711/113; 711/4; 360/97.01
(58) Field of Search ................................ 711/4, 5, 100, 711/111, 112, 113; 360/97.01

(56) References Cited

U.S. PATENT DOCUMENTS

| | | | | |
|---|---|---|---|---|
| 5,768,226 A | * | 6/1998 | Ogino ...................... 369/44.28 |
| 5,896,540 A | * | 4/1999 | Asano et al. ................ 710/260 |
| 6,373,654 B1 | * | 4/2002 | Iwahara et al. ........... 360/97.01 |
| 6,618,548 B1 | * | 9/2003 | Inoue et al. ................... 386/52 |
| 2003/0123354 A1 | * | 7/2003 | Takahashi ................... 369/53.2 |

\* cited by examiner

*Primary Examiner*—Pierre Bataille
(74) *Attorney, Agent, or Firm*—Milad G. Shara, Esq.; Blakely Sokoloff Taylor & Zafman (57) ABSTRACT

A rotating media storage device (RMSD) includes a cache memory and a microprocessor for executing a read caching algorithm for storing data in the cache memory. The microprocessor modifies the read caching algorithm when a vibration state is detected to optimize data transfer rates to and from the media in a vibrating operational environment.

50 Claims, 11 Drawing Sheets

ADAPTIVELY MODIFYING A READ CACHING ALGORITHM BASED UPON THE DETECTION OF A VIBRATION STATE WITHIN A ROTATING MEDIA STORAGE DEVICE

BACKGROUND OF THE INVENTION

1. Field of the Invention

The present invention relates to rotating media storage devices. More particularly, the present invention relates to an apparatus and method for adaptively modifying a read caching algorithm based upon the detection of a vibration state within a rotating media storage device to optimize data transfer rates to and from the media in a vibrating operational environment.

2. Description of the Prior Art and Related Information

Computer systems rely on rotating media storage devices (RMSDs) which employ a moveable head actuator to frequently access large amounts of data stored on the media, one example of which is a hard disk drive. One critical aspect of designing a RMSD in an extremely competitive market is its performance, typically measured by benchmark programs. The benchmark programs measure, among other things, the time required to perform a series of data transfer commands such as read commands. The time required to execute a given command is dependent on several factors including mechanical latency, cache size, and the efficiency of cache management.

One key aspect of mechanical latency in a RMSD is media rotational speed. In a competitive environment, products such as disk drives at a comparable price point offer comparable rotational speeds. Another aspect of mechanical latency is seek time, which generally measures the time required to move a head actuator from a current position to a target position. The seek time is determined by the mechanical characteristics of the head actuator, sometimes termed head stack assembly, and a seek profile which defines, during the time the actuator is accelerated and decelerated en route to the target position, an instantaneous desired velocity or acceleration/deceleration designed to achieve an efficient and predictable arrival of the head supported by the actuator over the target position on the media. Disk drive makers work diligently to improve the mechanics of the head stack assembly and the seek profile used to manage the seek operation. Nevertheless, disk drives at comparable price points tend to exhibit similar seek time characteristics.

In one approach to mitigating mechanical latency, disk drives have queued a series of commands and reordered their execution according to a variety of latency schemes which attempt to minimize thrashing the actuator between target locations. Several of such schemes are outlined in European patent EP 0 757 310 A2 to Chen et al, (CHEN) including SSTF (shortest seek time first) which assigns a seek time based on "the number of tracks the arm crosses," and STF (shortest time first) which assigns a latency based on both seek time and rotational latency. Another patent U.S. Pat. No. 5,729,718 to Au discloses command queue reordering driven by latency calculations.

In another aspect, queued commands specifying sequential data areas have been coalesced into contiguous operations to improve execution efficiency. Despite these measures, opportunity exists for further performance improvement. Presently, disk drives which employ the Enhanced IDE (EIDE) interface or equivalents are effectively operated in a single thread (one command at a time) environment from the host viewpoint and have somewhat limited options for command queuing compared to SCSI disk drives where the host computer can cooperate with command queuing.

In another effort to overcome limitations imposed by mechanical latency, disk drives have employed cache memory to reduce command execution time by providing host computer-requested data from a cache memory, rather than from the disk directly. This technique is useful because host computer programs frequently request (read) data that is repetitive or co-located or sequential with previously requested data. The disk drive, having anticipated such requests, is able to furnish data from a semiconductor memory and thus avoid mechanical latency. The process of reading data which is co-located or sequential with host requested data is often termed "read-ahead" and may involve reading data which precedes the host-requested data (pre-read) and data which follows the host-requested data (post-read). Utilizing these types of read caching algorithms improves data transfer rates. U.S. Pat. No. 5, 133,060 to Weber et al for example discloses a look-ahead (read-ahead) strategy for a cached disk drive.

Figure 1A:
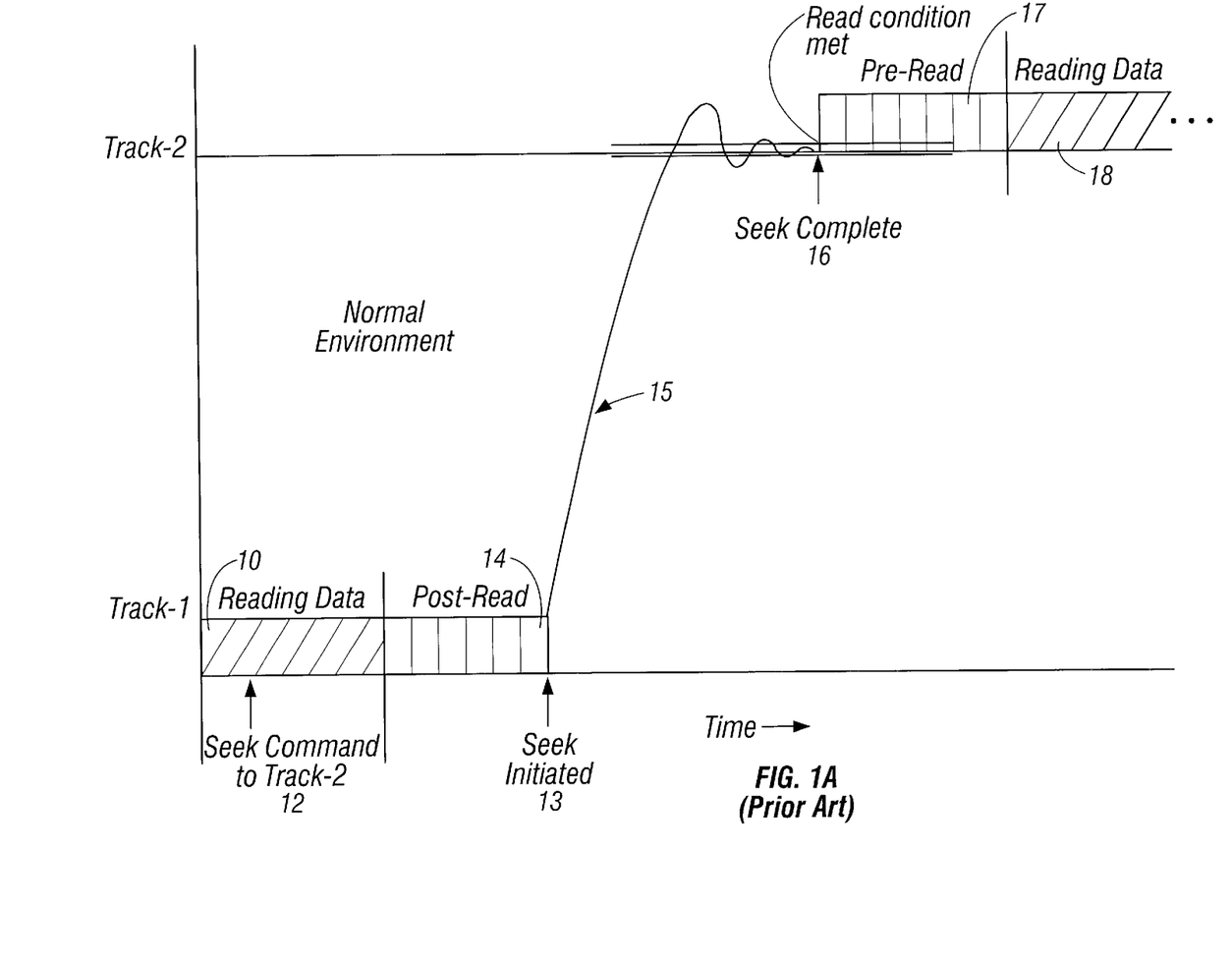
FIG. 1A is an example of a standard read caching algorithm utilizing post-reads in a non-vibrating operational environment.

Looking at FIG. 1A, an example of a standard read caching algorithm utilizing post-reads in a non-vibrating operational environment is illustrated. Data 10 is read along Track-1 and a seek command to Track-2 is received at point 12. Consequent to this event, the time to seek to the second track is calculated. The read caching algorithm typically performs a post-read 14 along Track-1 and a seek is initiated at point 13. Line 15 illustrates the movable head of the RMSD moving from Track-1 to Track-2. Particularly, as line 15 illustrates, the movable head seeks and settles to Track-2. A read condition is then met such that the seek and settle operation is complete and an on-track condition is declared at point 16. The read caching algorithm then typically performs a pre-read 17 on-track-2 and then further proceeds to read the desired data 18. As previously discussed, by performing the post-read 14 and further the pre-read 17, and reading this data into semiconductor memory, the overall data transfer rate can be improved. Unfortunately, this only holds true in a non-vibrating operational environment.

Figure 1B:
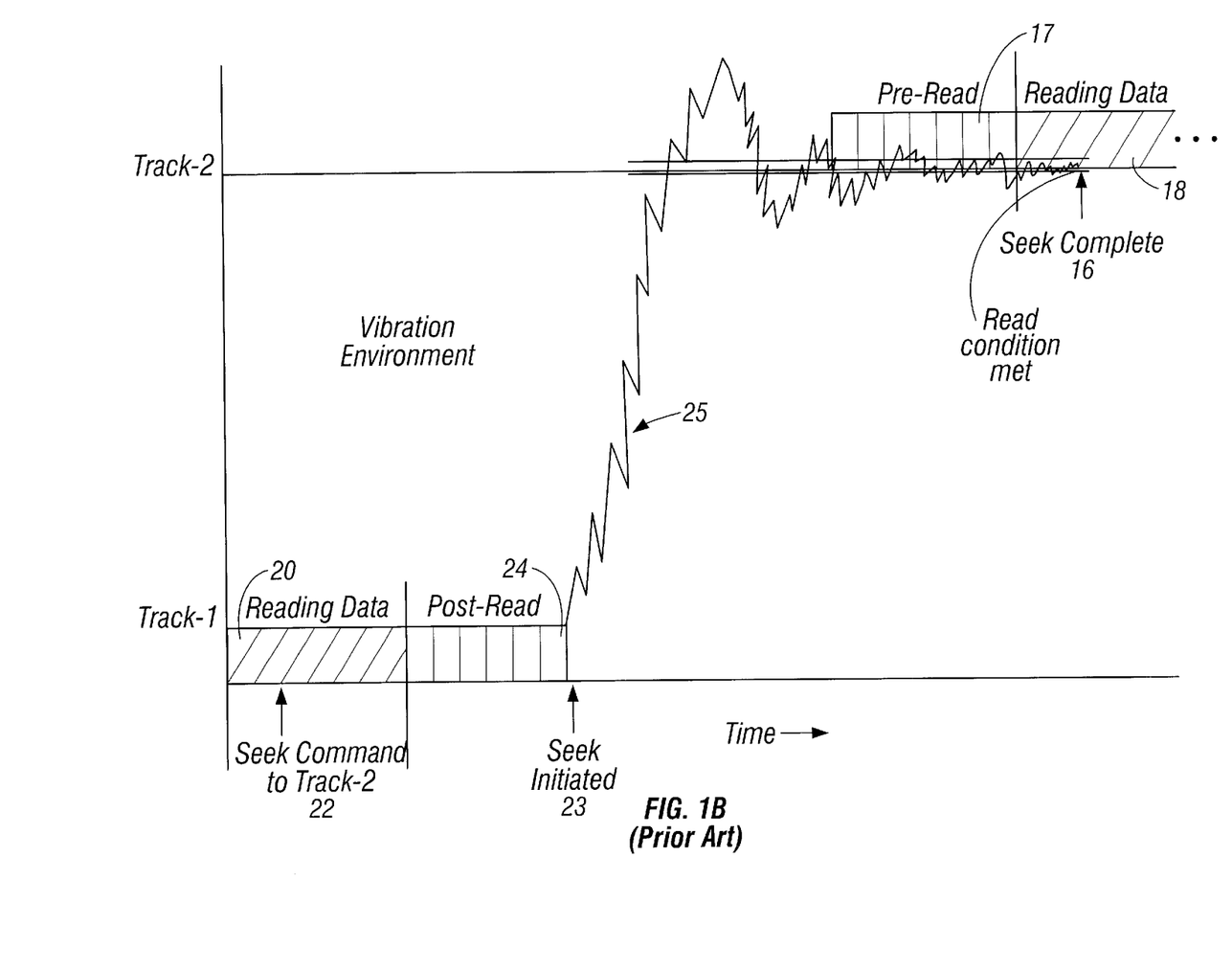
FIG. 1B is an example of a standard read caching algorithm utilizing post-reads in a vibrating operational environment.

As shown in FIG. 1B, an example of a standard read caching algorithm utilizing post-reads in a vibrating operational environment is illustrated. Here, data 20 is read along Track-1 and a seek command to Track-2 is received at point 22. Consequent to this event, the time to seek to the second track is calculated. The read caching algorithm typically performs a post-read 24 along Track-1 and the seek is initiated at point 23 based on the calculated time to seek to the second track. Line 25 illustrates the movable head of the RMSD moving from Track-1 to Track-2 in a vibrating operational environment. Particularly, as line 25 illustrates, the movable head is subjected to vibration while seeking and settling to Track-2.

However, due to the vibrating operational environment, the movable head does not settle on the required track until point 16 (at which point reading can begin). Thus, the moveable head does not settle on the intended pre-read portion 17. Unfortunately, the pre-read portion 17 and missed data 18 still need to be read and the disk of the RMSD must perform another revolution to capture the missed data. This results in an entirely wasted revolution of the disk and seriously degrades the data transfer rate of the RMSD.

SUMMARY OF THE INVENTION

The present invention relates to adaptively modifying a read caching algorithm based upon the detection of a vibration state within a rotating media storage device (RMSD) to optimize data transfer rates to and from the media in a vibrating operational environment.

In one aspect, the invention may be regarded as a RMSD connected to a host computer that is subject to periods of sustained vibration which can cause a vibration state to exist. The RMSD includes a disk having at least a first track and a second track, a moveable head, a cache memory and a microprocessor for controlling operations in the RMSD including seek operations and a read caching algorithm for read operations that include pre-read operations and post-read operations. The RMSD further includes a means for monitoring for the existence of a vibration state. If a vibration state is detected, the microprocessor of the RMSD under the control of a program modifies the read caching algorithm based on the vibration state to optimize data transfer rates to and from the media in a vibrating operational environment.

In a more particular aspect, the invention may be regarded as a RMSD connected to a host computer that is subject to periods of sustained vibration which can cause a vibration state to exist that utilizes even more detailed steps to optimize data transfer rates to and from the media in the vibrating operational environment. Again, the RMSD includes a disk having at least a first track and a second track, a moveable head, a cache memory and a microprocessor for controlling operations in the RMSD including seek operations and a read caching algorithm for read operations that include pre-read operations and post-read operations. The RMSD further includes a means for monitoring for the existence of a vibration state. If a vibration state is detected, the microprocessor of the RMSD under the control of a program estimates a read access time to the second track from the first track based on the vibration state, modifies the read caching algorithm based on the vibration state, and commands the moveable head to seek to the second track in order to optimize data transfer rates to and from the media in the vibrating operational environment.

Preferably, the microprocessor modifies the read caching algorithm by adjusting the amount of post-read performed on the first track based on the vibration state. The microprocessor calculates an amount of post-read to be performed on the first track before seeking to the second track, in which, the amount of post-read is dependent upon a measured amount of vibration. Particularly, the amount of post-read to be performed on the first track may be inversely proportion to the measured vibration. Moreover, in one aspect, the microprocessor modifies the read caching algorithm based on the vibration state by eliminating the post-read operation of the first track and immediately commanding the moveable head to seek to the second track.

In still another aspect, the invention may also be regarded as a method for a RMSD to efficiently switch between a read operation on a first track of a disk to a second track and to then perform either a read or write operation on the second track, in a vibrating operational environment. The method comprises the steps of: monitoring for the existence of a vibration state; and if a vibration state is detected, estimating a read access time to the second track based on the vibration state, modifying a read caching algorithm based on the vibration state, and then seeking to the second track.

In yet another aspect, the invention may further be regarded as a computer system having a host computer and an RMSD, in which, the RMSD is subject to periods of sustained vibration causing a vibration state to exist. The RMSD includes a disk including at least a first track and a second track, a moveable head, a cache memory, and a microprocessor for controlling operations in the RMSD including seek operations and a read caching algorithm for read operations that include pre-read operations and post-read operations, and a means for monitoring for the existence of a vibration state. If a vibration state is detected, the microprocessor of the RMSD under the control of a program estimates a read access time to the second track from the first track based on the vibration state, modifies the read caching algorithm based on the vibration state, and commands the moveable head to seek to the second track in order to optimize data transfer rates to and from the media in a vibrating operational environment.

The foregoing and other features of the invention are described in detail below and set forth in the appended claims.

DETAILED DESCRIPTION

Figure 2:
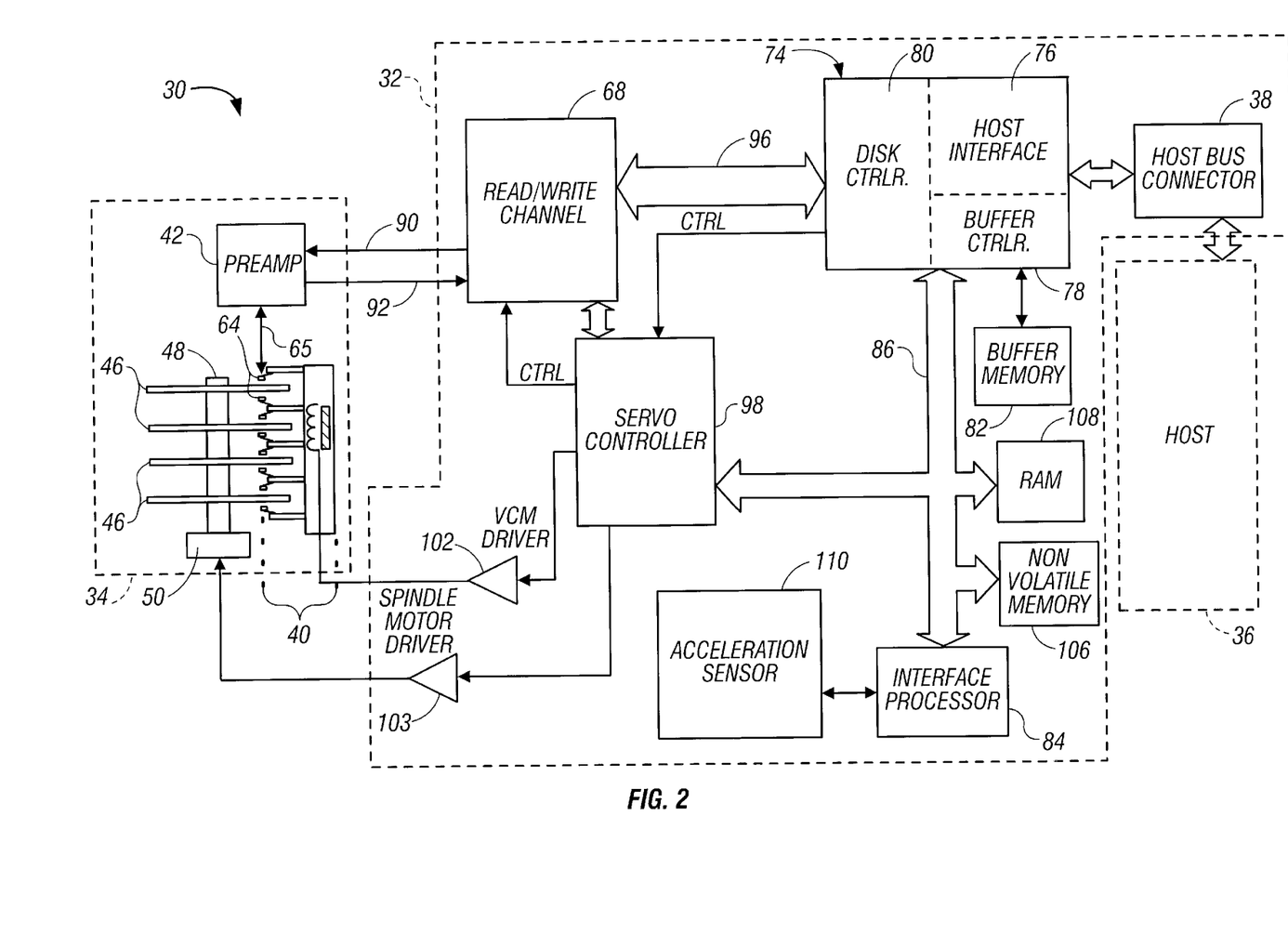
FIG. 2 is a block diagram of a disk drive in which the method and apparatus of the invention may be practiced.

FIG. 2 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Enhanced IDE (EIDE) standard presently favored for desktop personal computers. Disk drive 30 comprises a Head/Disk Assembly, HDA 34, and a controller printed circuit board assembly, PCBA 32.

HDA 34 comprises: one or more disks 46 for data storage; a spindle motor 50 for rapidly spinning each disk 46 (four shown) on a spindle 48; and an actuator assembly 40 for swinging a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

An acceleration sensor 110 may be mounted to the PCBA and coupled to the microprocessor 84. The acceleration sensor 110 monitors for the existence of a vibration state and measures the amount of vibration that the disk 30 is experiencing. The acceleration sensor 110 transmits to the microprocessor 84 a value indicating the measured amount of vibration the disk 30 is experiencing. In one embodiment, the acceleration sensor 110 may be an accelerometer, however, many other types of acceleration sensors may be used.

Figure 3A:
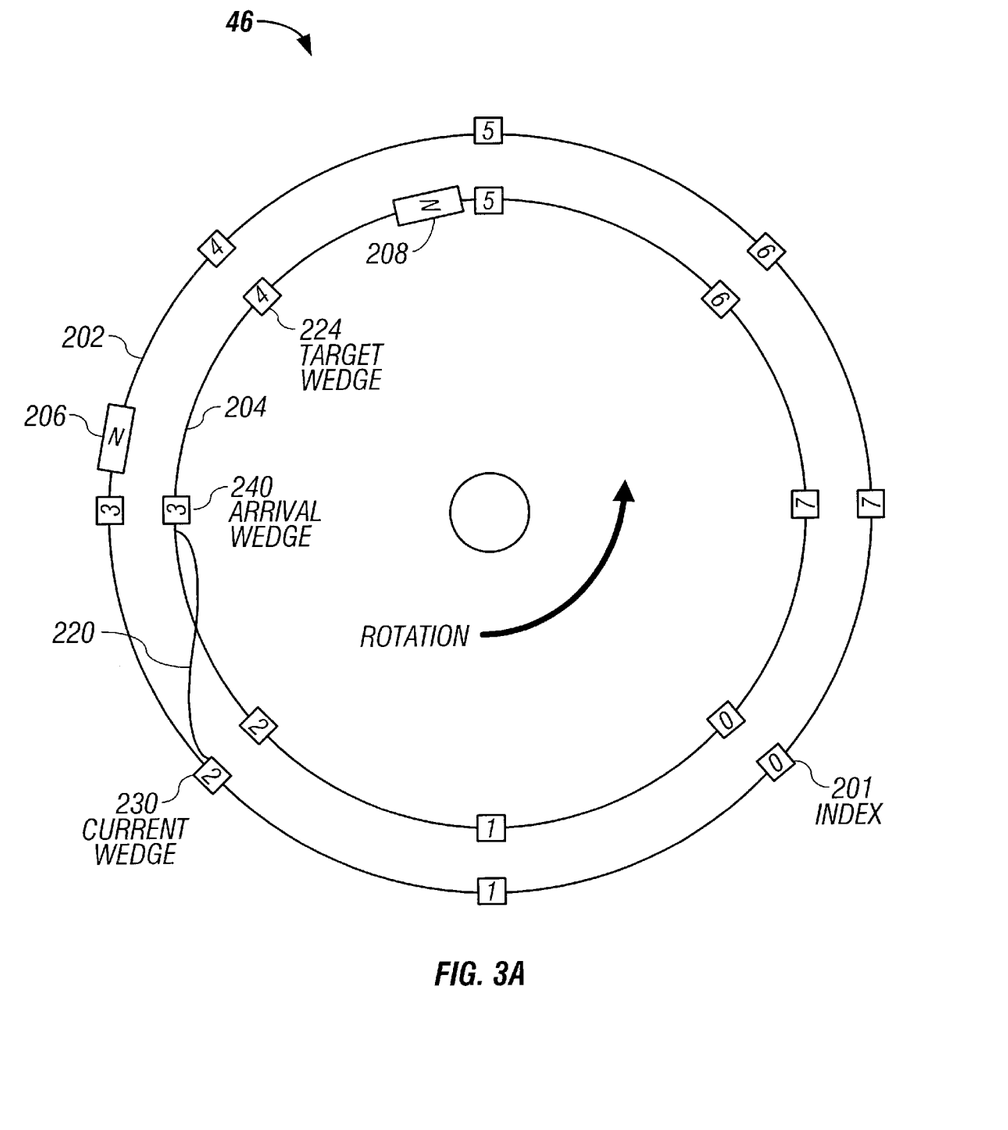
FIG. 3A is a diagram of a disk in the disk drive of FIG. 2 showing the layout of servo wedge and data sectors on two exemplary tracks and the relationship of a current position to a landing position and a target position.

Now turning to FIG. 3A, two exemplary tracks 202, 204, recorded on a disk 46 are shown. Since heads are swung in unison over disks 46 to read and write tracks and therefore tracks are in effect stacked in a cylinder when multiple disks 46 are mounted, each track position may be termed a cylinder. For purposes of this discussion, the tracks 202 and 204 in the diagram of FIG. 3A may be on a common disk 46 surface or on separate surfaces of disks 46.

Assuming the disk 46 is rotated in the direction shown, one servo wedge sector 201 is designated as an index or zero reference point for the start of a track. The head 64 hovers over a track as the disk rotates and is maintained in position over the track by reading each sequential servo sector passing beneath the head 64 for a selected active disk surface and computing a correction value for the actuator. FIG. 3A shows two tracks 202, 204 each having eight servo wedge sectors for discussion purposes. As is well known in the art, a practical disk format may include 90 servo wedge sectors and thousands of tracks or comparable variants depending on rotational speed and areal density design targets. Data sectors such as 206 and 208 are located in the intervals between servo wedge sectors.

As disk 46 is rotated, servo wedge sectors from 0 to 7 will pass beneath head 46. Each servo wedge 0–7 may be termed a rotational position, while each track or cylinder 202, 204 may be termed a radial position. Because of the sampled servo system employed, position is only "known" at the sampling points and therefore rotational position is synonymous with a given servo wedge. If we assume that the head is presently over track 202 and presently sampling servo wedge 2, labeled as "current wedge" 230, a command to read a data sector 208 in track 204 located in the interval between servo wedge 4 and 5 would cause the actuator 40 to be moved (executing a seek operation) from present cylinder 202 to target cylinder 204. The sinusoidal path followed by the actuator relative to the recorded tracks is indicated by line 220. Given the rotation of the disk and an exemplary seek trajectory, the actuator arrives over track 204 such that servo wedge 3 is passing under the head. In this scenario, servo wedge 3 may be termed an "arrival wedge" 240 to indicate the servo wedge that will next be sampled when the actuator arrives at the target cylinder. The servo wedge to be sampled just prior to the interval where the target data sector is located is termed a "target wedge" 224. Note that in the example of FIG. 3A, the actuator will land at the target track one servo wedge ahead of the target wedge.

Of further note in FIG. 3A, data is stored in data sectors, which are referenced as logical blocks by the host computer and translated into physical sectors by disk drive firmware. Because of latency in the case of a head switch between like cylinders, data sectors which store logically sequential data blocks are assigned to physical data sectors which are offset or "skewed" to compensate for the latency and minimize rotational latency delays. Such a skew is shown by the relative offset between data sector 206 and data sector 208. The skew is taken into account to identify a target wedge in response to a data transfer command from host 36.

Figure 3B:
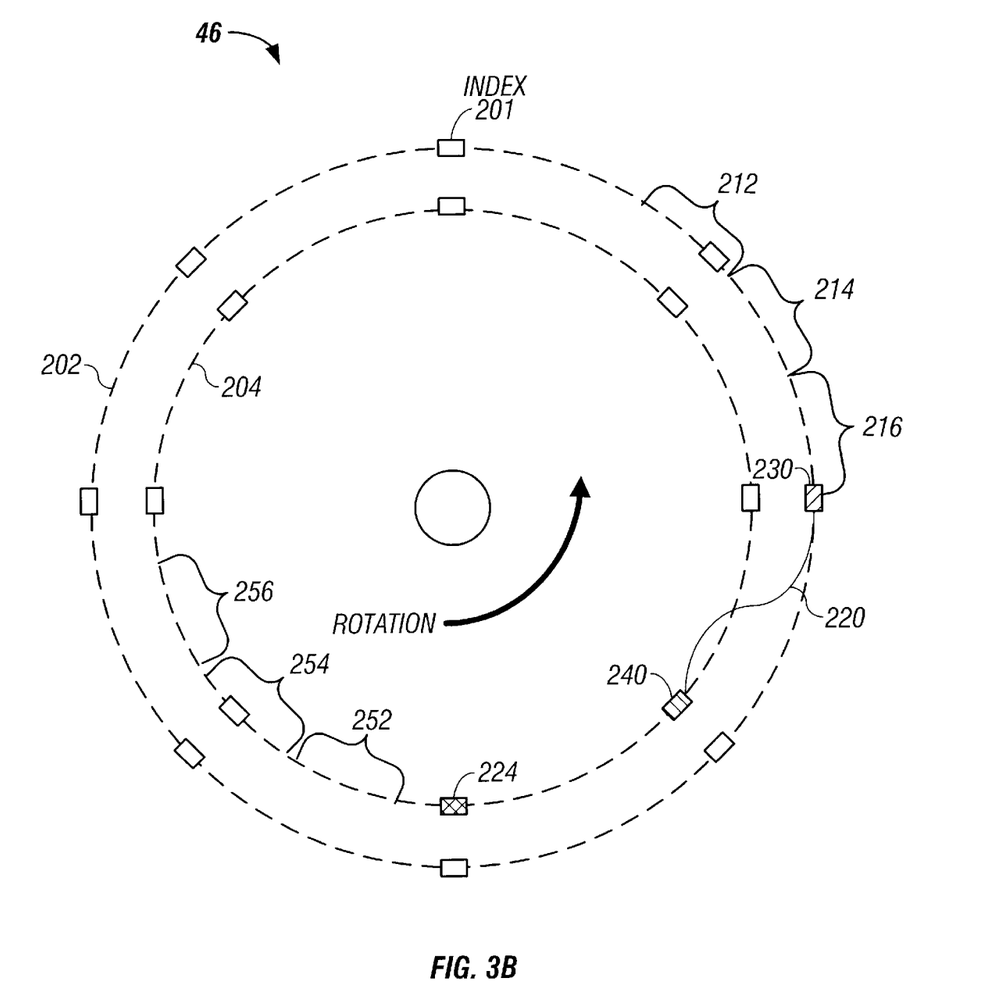
FIG. 3B is a more detailed diagram of FIG. 3A particularly showing pre-read and post-read segments.

FIG. 3B once more shows disk 46 and tracks 202, 204 for illustrating the relative components of data transfer locations involved in processing a current host request and in processing a subsequent new host request for use in explaining the present invention. A current host read request defines a target data segment 214 on-track 202 by specifying a starting logical block address (LBA) and a count of blocks to be transferred. In anticipation of co-located future transfer requests, target segment 214 is bracketed by a pre-read segment 212, and a post-read or "read-ahead" segment 216. Each segment 212, 214, and 216 is read from the disk 46 and stored in cache buffer memory 82 via disk controller 80 and buffer controller 78. Preferably, a minimum and maximum size is assigned to each of pre-read segment 212 and post-read segment 216. The optimum sizes may be determined in accordance with disk variables such as cache size and transfer rate, and system variables such as operating system buffer sizes and disk management routines. By defining and varying minimum and maximum pre-read and post-read segment sizes, the operation of the disk drive can be tuned to achieve improved performance when coupled to host computer applications.

Now assume that the current wedge is 230 on current track 202, as shown in FIG. 3B, and that the disk drive receives a request to transfer data from target segment 254 located on target track 204. Microprocessor 84 calculates that if a seek 220 is initiated from the current wedge 230 to target cylinder 204, the arrival wedge will be 240 and the target wedge will be 224. For the new request, a target pre-read segment 252 is defined and a target post-read segment 256 is defined. In a conventional disk drive, in a normal operating environment, the entire post-read segment 216 is read and the seek 220 is initiated. As previously discussed, by performing the post-read segment 216 and further the pre-read segment 252, and reading this data into semiconductor memory, the overall data transfer rate can be improved.

Unfortunately, this only holds true in a non-vibrating operational environment. In a vibrating operational environment, the movable head 64 of the disk drive 30 may not be able complete the seek operation in time and thus the read operation may completely miss the pre-read segment 252 and a large portion of the target segment 254 on the current revolution. Since, the pre-read segment 252 and the target segment 254 still need to be read and the disk drive 30 has to perform another revolution to capture the missed data. This results in an entirely wasted revolution of the disk drive 30 and seriously degrades the data transfer rate of the disk drive 30.

To remedy this, the present invention optimizes data transfer rates to and from the media even in a vibrating operational environment. As previously discussed, the disk drive 30 includes a moveable head 64, a cache memory 82 and a microprocessor 84 for controlling operations in the disk drive 30 including seek operations and a read caching algorithm for read operations that include pre-read operations and post-read operations. The disk drive 30 further includes a means for monitoring for the existence of a vibration state. As previously discussed, the means may include the acceleration sensor 110. Furthermore, as will be discussed in more detail later, the means may include measuring position error signal PES values or monitoring data read errors. If a vibration state is detected, the microprocessor 84 of the disk drive 30 under the control of a program or routine estimates a read access time to the second track from the first track based on the vibration state, modifies the read caching algorithm based on the vibration state, and commands the moveable head 64 to seek to the second track in order to optimize data transfer rates to and from the media even in the vibrating operational environment.

Preferably, the microprocessor 84 modifies the read caching algorithm by adjusting the amount of post-read performed on the first track based on the vibration state. In one aspect, the microprocessor calculates an amount of post-read to be performed on the first track before seeking to the second track, in which, the amount of post-read is dependent upon a measured amount of vibration. Particularly, the amount of post-read to be performed on the first track may be inversely proportion to the measured vibration. Moreover, in one aspect, the microprocessor 84 modifies the read caching algorithm based on the vibration state by eliminating the post-read operation of the first track and immediately commanding the moveable head to seek to the second track. It should be appreciated that many of the method steps to be hereinafter described are implemented by the microprocessor 84 operating under the control of a program or routine.

Figure 4A:
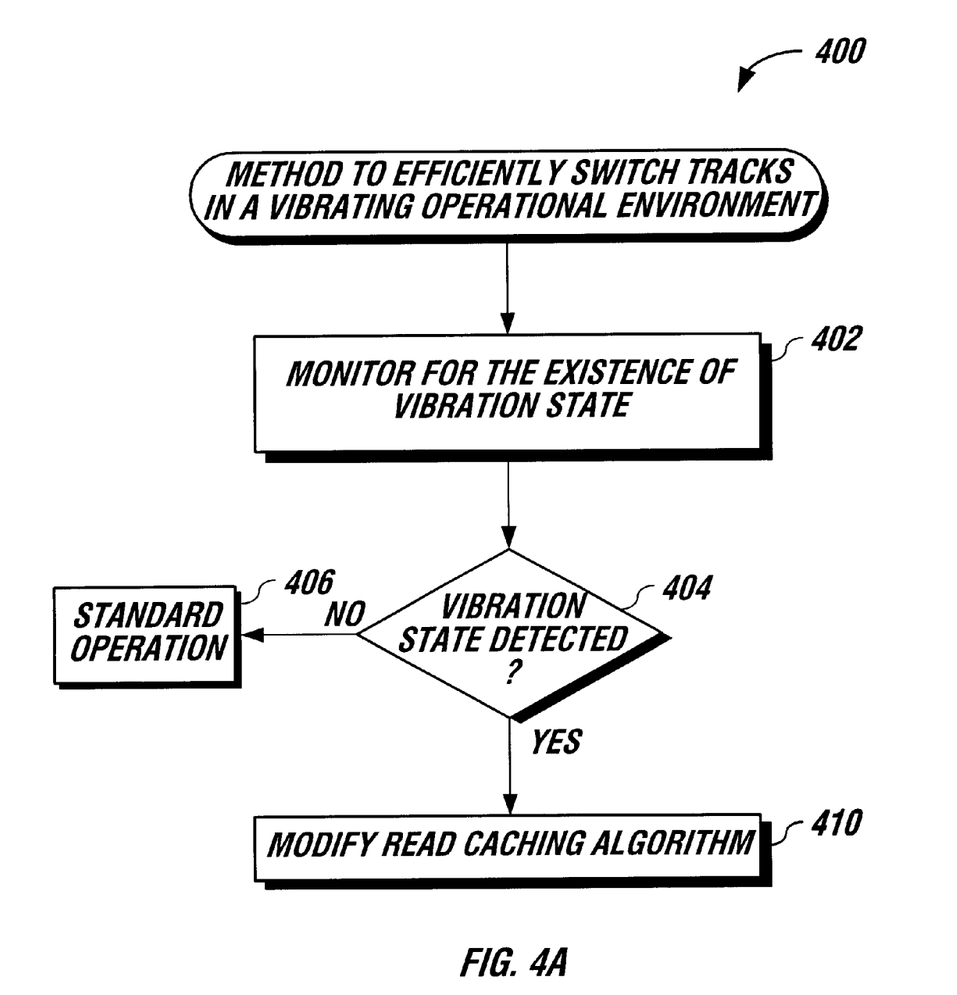
FIG. 4a is a flowchart showing a method of the invention for efficiently switching tracks in a vibrating operational environment.

Now turning to FIG. 4a, a flowchart of a method 400 of the invention for efficiently switching tracks in a vibrating operational environment is illustrated. At step 402, the method monitors for the existence of a vibration state. A vibration state can be determined by measuring position error signals PESs (e.g. PES amplitudes or PES standard deviations) or monitoring for data read errors. For example, the PESs or data read errors can be averaged or summed for a predetermined past amount of servo wedges, e.g. 50–100, or based on some other period or measure. Alternatively, a vibration state can be determined based upon a measured value of the amount of vibration the disk drive 30 is being subjected to from the acceleration sensor 110. At a predetermined threshold of measured vibration, a vibration state is declared. Next, at step 404, if a vibration state is not detected then the disk drive 30 proceeds with standard operations at step 406.

On the other hand, if at step 404 it is determined that a vibration state exists, then at step 410, the current read caching algorithm is modified in view of the measured vibration. Specific examples of particular modifications to read caching algorithms will be discussed in detail, later, with reference to FIGS. 5–8.

Figure 4B:
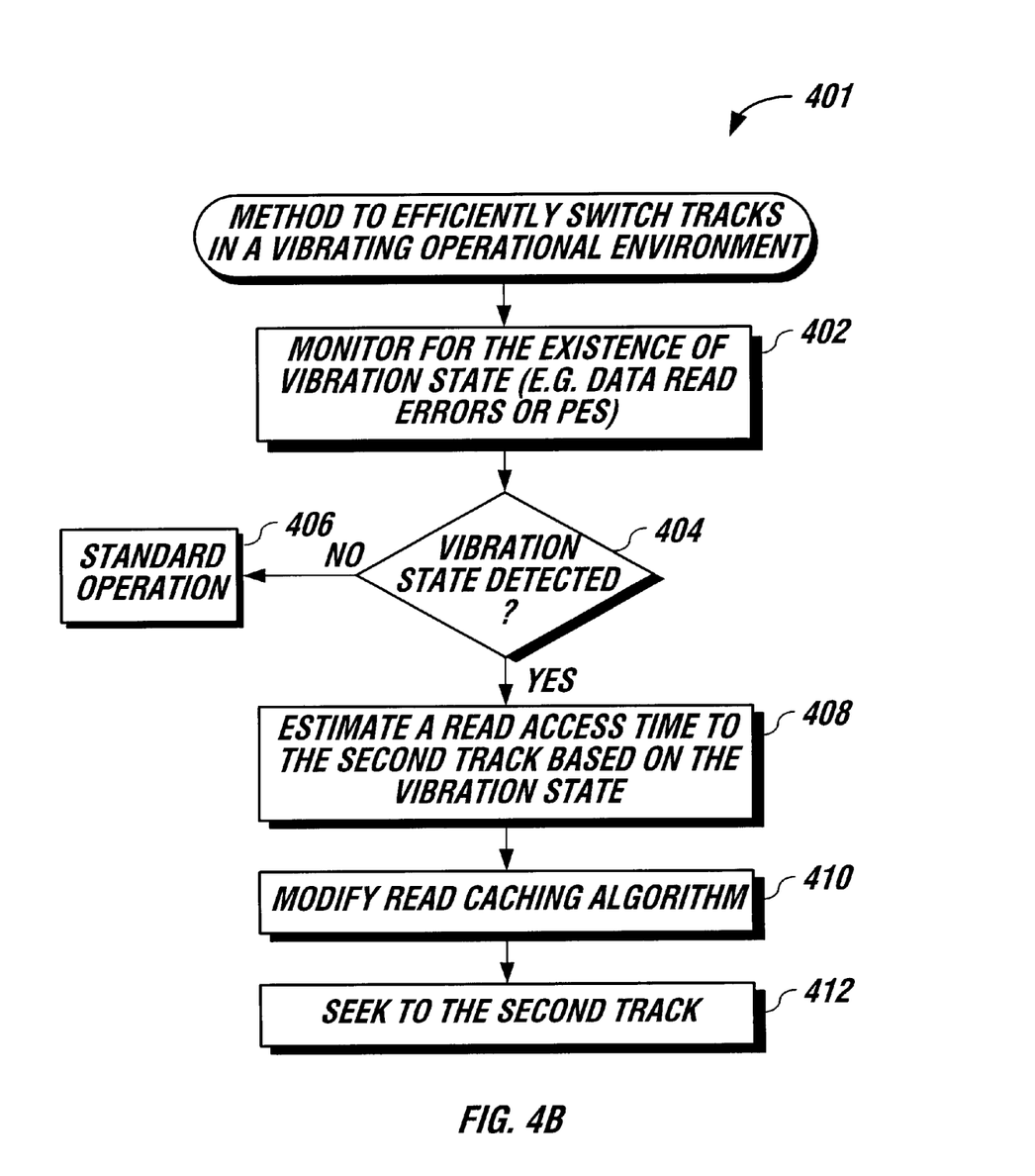
FIG. 4b a flowchart of another embodiment of the method of the invention for efficiently switching tracks in a vibrating operational environment.

Referring now to FIG. 4b, a flowchart of another embodiment of the method 401 of the invention for efficiently switching tracks in a vibrating operational environment is illustrated. At step 402, the method monitors for the existence of a vibration state. A vibration state can be determined by measuring position error signals PESs (e.g. PES amplitudes or PES standard deviations) or monitoring for data read errors. For example, the PESs or data read errors can be averaged or summed for a predetermined past amount of servo wedges, e.g. 50–100, or based on some other period or measure. Alternatively, a vibration state can be determined based upon a measured value of the amount of vibration the disk drive 30 is being subjected to from the acceleration sensor 110. If the measured vibration is beyond a predetermined threshold of vibration, then a vibration state is declared. Next, at step 404, if a vibration state is not detected then the method proceeds with standard operations at step 406.

On the other hand, if at step 404 it is determined that a vibration state exists, then at step 410 a read access time to the second track (from the first track currently being read) is estimated based on the amount of measured vibration at step 402. Algorithms to determine a seek time from a first track to a second track in a disk drive in view of vibration are well known at the art. Furthermore, at step 410, the current read caching algorithm is modified in view of the measured vibration. Specific examples of particular modifications to read caching algorithms will be discussed in detail, later, with reference to FIGS. 5–8. After modifying the read caching algorithm, the method commands the head 64 to seek to the second track. Once the head 64 settles on the second track, an on-track condition is declared. Next, a read or write operation may be performed on the second track.

Figure 5:
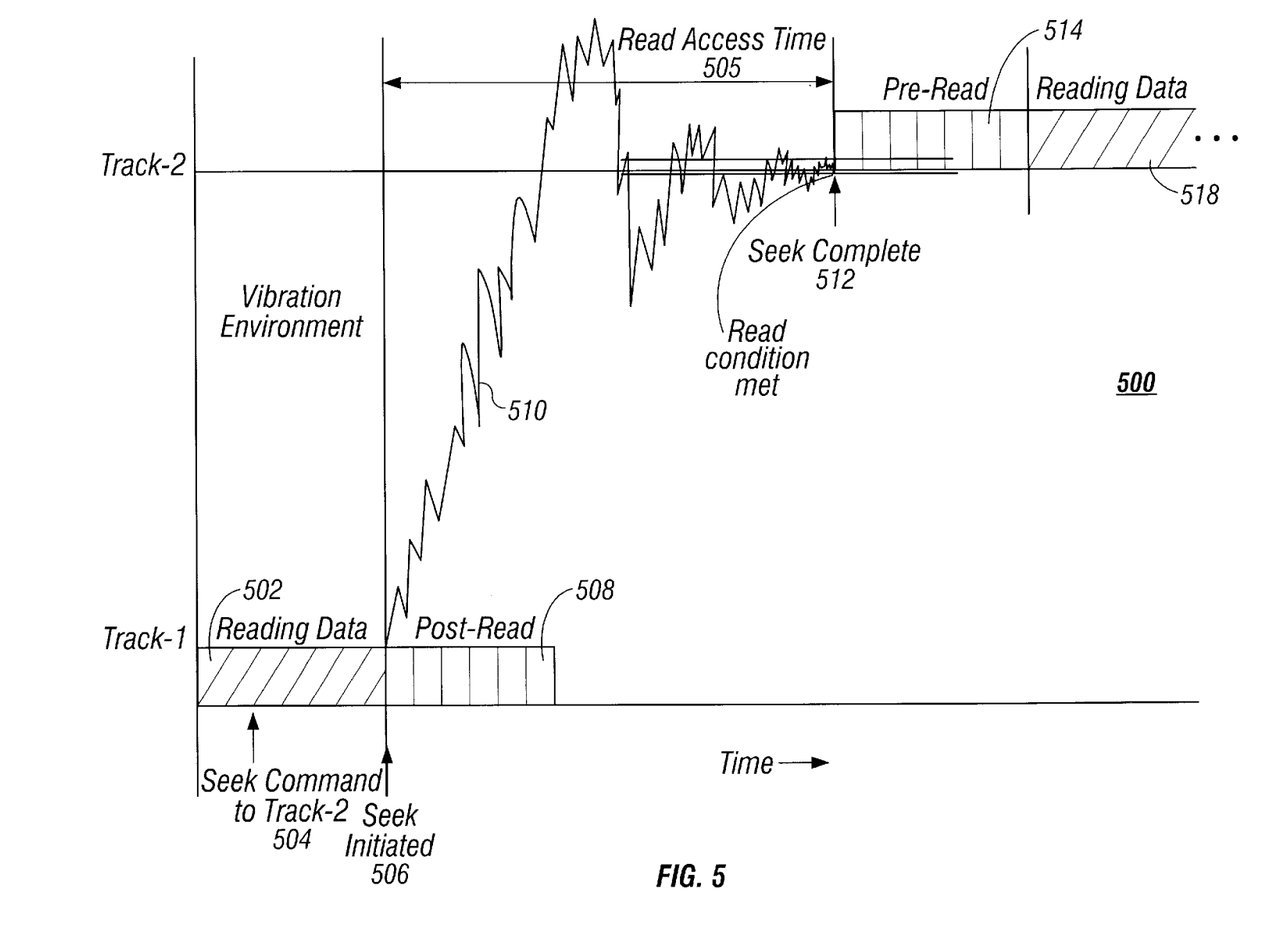
FIG. 5 is a diagram illustrating an example of a modified read caching algorithm of the invention, in which the post-read operation of the first track is eliminated based on the vibration state.

Referring now to FIG. 5, a diagram illustrating a modified read caching algorithm 500 based on the vibration state, in which the post-read operation of the first track is eliminated, is shown. Here, data 502 is read along Track-1 and a seek command to Track-2 is received at point 504. Consequent to this event, a read access time 505 to the second track based on the vibration state is estimated. In this case, based on the estimated read access time, the modified read caching algorithm completely eliminates the post-read operation 508 of the first track and at point 506 immediately initiates the seek to the second track. Line 510 illustrates the head 64 of the disk drive 30 moving from Track-1 to Track-2 in the vibrating operational environment. Particularly, line 510 illustrates that the head 64 is subjected to vibration while seeking and settling to Track-2.

Even though the head 64 is subjected to vibration, since the read caching algorithm was modified to eliminate the post-read operation 508, a read condition is still met such that the seek operation is complete and an on-track condition is declared at point 512, before the pre-read 514. The modified read caching algorithm then performs a pre-read 514 on-track-2 and then further proceeds to read the desired data 518. Alternatively, it should be appreciated that after an on-track condition is declared at point 512, a write operation can be performed instead of a read operation. By utilizing the modified read caching algorithm, which eliminates the post-read operation, the head can still seek and settle to the second track even in the vibrating operational environment, without having to waste an additional rotation.

Figure 6:
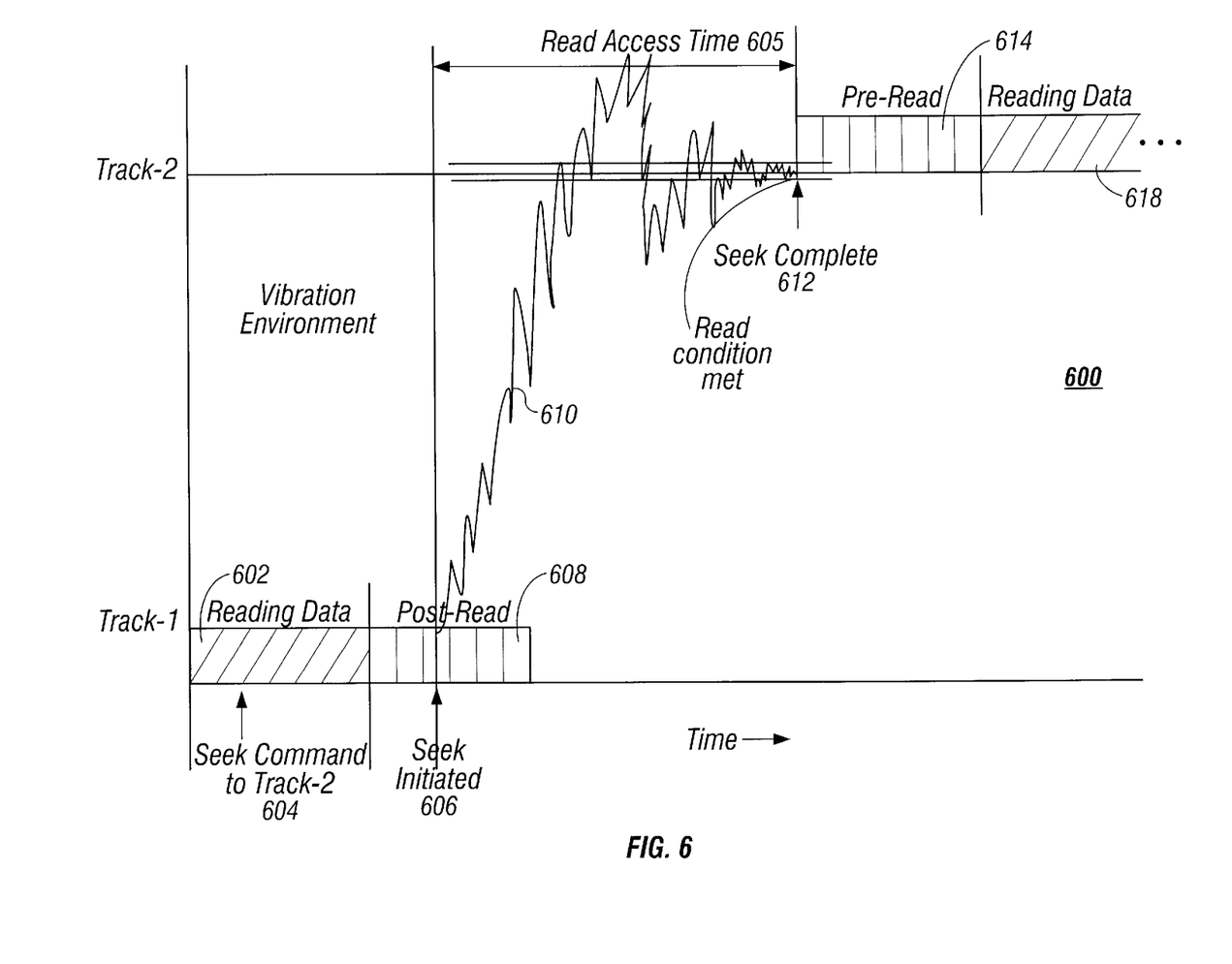
FIG. 6 is a diagram illustrating an example of a modified read caching algorithm of the invention, in which the post-read operation of the first track is reduced based on the measured amount of vibration.

Turning now to FIG. 6, FIG. 6 shows a diagram illustrating a modified read caching algorithm 600 based on the vibration state, in which the post-read operation of the first track is reduced based on the measured amount of vibration. Specifically, the read caching algorithm may be modified based on the measured amount of vibration, and particularly, the amount of post-read performed may be reduced dependent on the amount of measured vibration. In one embodiment, the amount of post-read to be performed on the first track is inversely proportional to the measured vibration. For example, in one embodiment, the microprocessor 84 can receive a value reflecting the amount of vibration from the acceleration sensor 110. Alternatively, the microprocessor 84 may calculate a value reflecting the amount of vibration based upon data read errors or PES values. Next, the microprocessor 84 calculates an amount of post-read to be performed on the first track before seeking to the second track, in which the amount of post-read performed is dependent on the measured vibration.

Here, data 602 is read along Track-1 and a seek command to Track-2 is received at point 604. Consequent to this event, a read access time 605 to the second track based on the amount of measured vibration is estimated. In this case, the read access time is estimated in such a way as to adjust the post-read operation 608 of the first track to accomplish the maximum of post-read 608, while still being able to complete the seek and settle operation in a sufficient amount of time to perform a pre-read 614 on the second track in view of the amount of measured vibration. Next, at point 606 the seek is initiated to the second track. Line 610 illustrates the head 64 of the disk drive 30 moving from Track-1 to Track-2 in the vibrating operational environment. Particularly, line 610 illustrates that the head 64 is subjected to vibration while seeking and settling to Track-2.

Even though the head 64 is subjected vibration, since the read caching algorithm was modified to adjust the amount of the post-read operation 608 in view of the amount of measured vibration, a read condition is still met such that the seek operation is complete and an on-track condition is declared at point 612, before the pre-read 614. The modified read caching algorithm Alternatively, it should be appreciated that after an on-track condition is declared at point 612, a write operation can be performed instead of a read operation. By utilizing the modified read caching algorithm, which reduced the amount of post-read operation 608, the head 64 can still seek and settle to the second track even in the vibrating operational environment, without having to waste an additional rotation.

Figure 7:
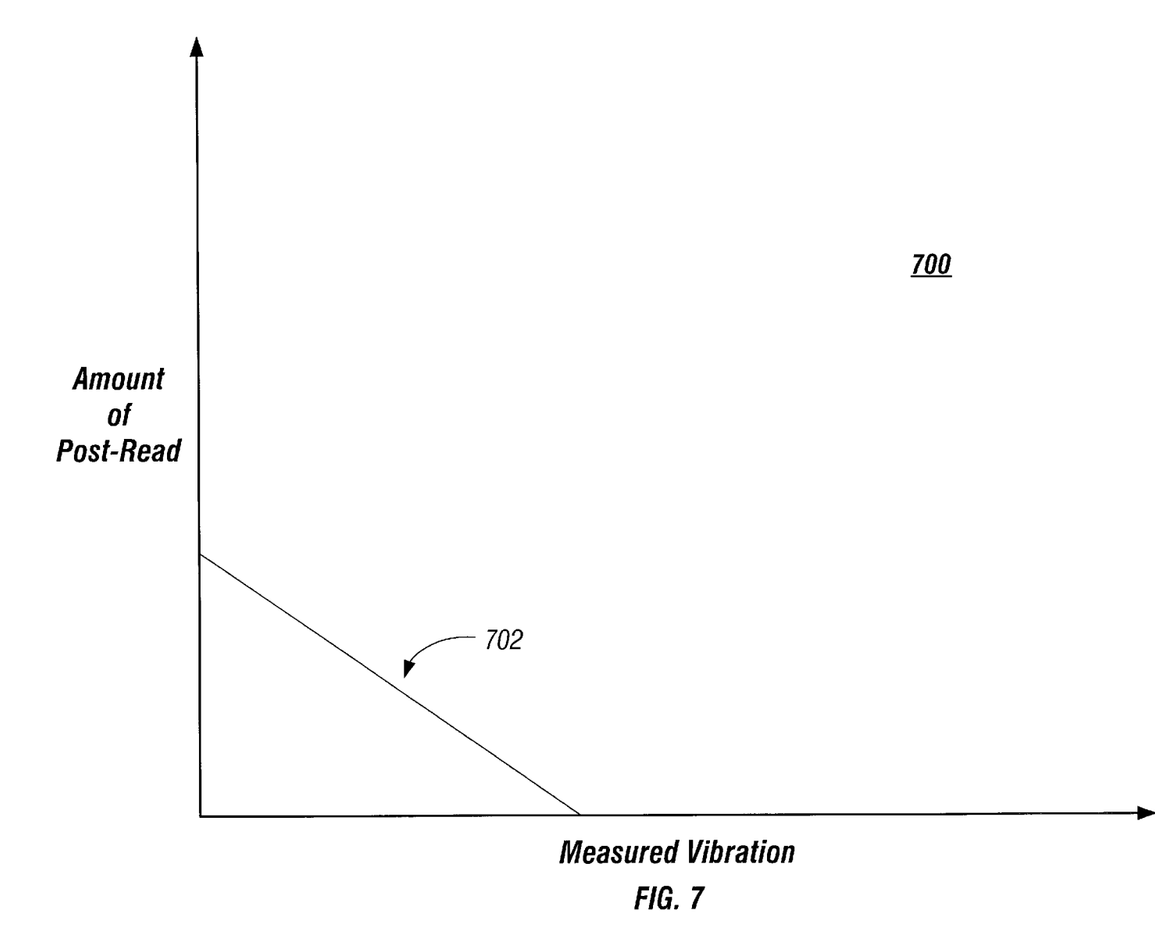
FIG. 7 illustrates one aspect of the invention, in which the amount of post-read to be performed on the first track is inversely proportional to the measured vibration.

FIG. 7 illustrates that in one embodiment of the invention, the amount of post-read to be performed on the first track is inversely proportional to the measured vibration. Particularly, the y-axis represents the amount of post-read to be performed and the x-axis represents the measured vibration. As seen in FIG. 7, line 702 shows the inversely proportional relationship between the amount of post-read to be performed on the first track versus the amount of measured vibration.

Figure 8:
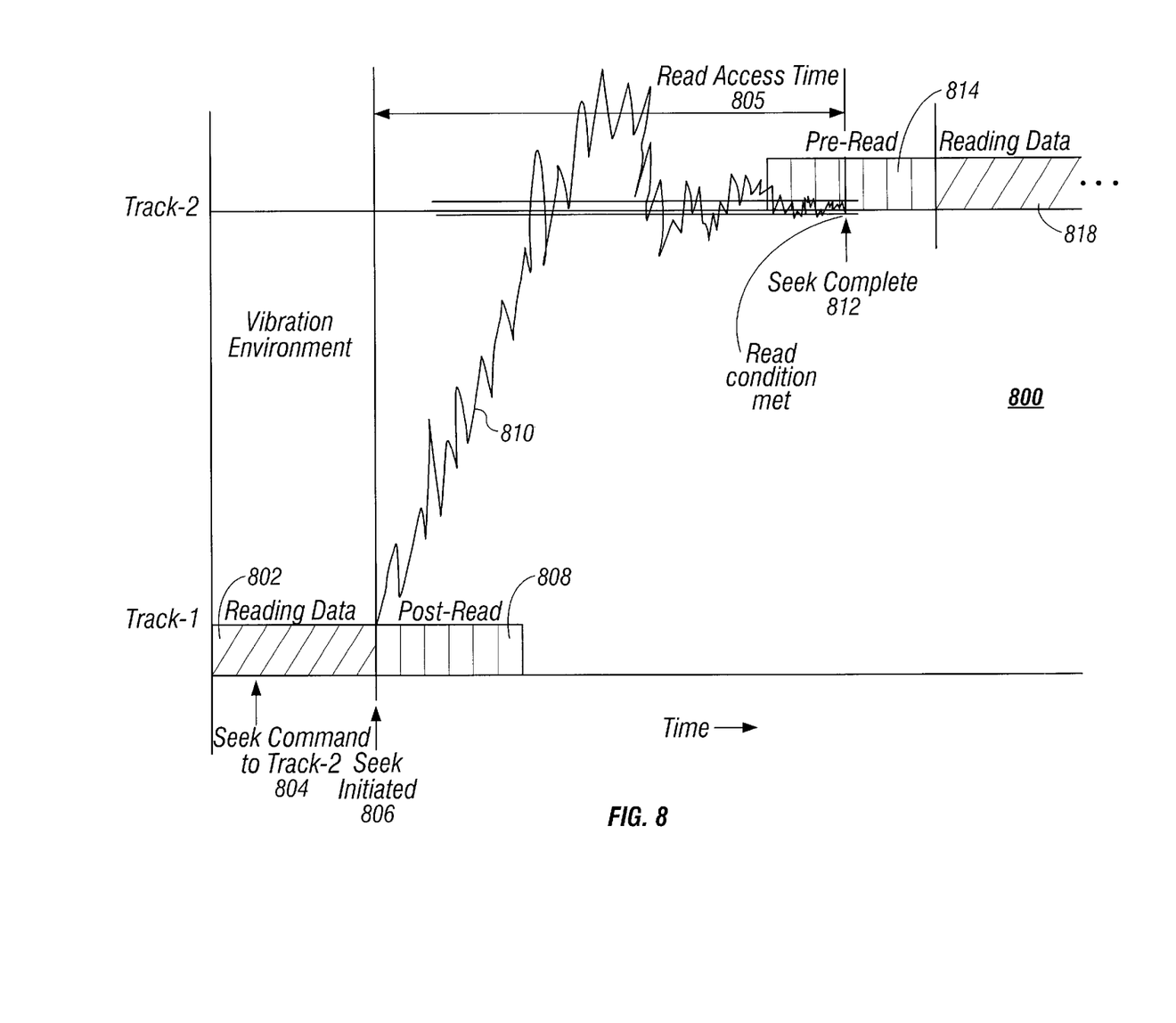
FIG. 8 is a diagram illustrating an example of a modified read caching algorithm of the invention, in which the post-read operation of the first track is eliminated and only a portion of the pre-read on the second track is performed based on the measured amount of vibration.

Referring now to FIG. 8, FIG. 8 shows a diagram illustrating a modified read caching algorithm 800 based on the vibration state, in which the post-read operation of the first track is eliminated and only a portion of the pre-read on the second track is performed. Here, data 802 is read along Track-1 and a seek command to Track-2 is received at point 804. Consequent to this event, a read access time 805 to the second track based on the vibration state is estimated. In this case, based on the estimated read access time, the modified read caching algorithm completely eliminates the post-read operation 808 of the first track and at point 806 immediately initiates the seek to the second track. Line 810 illustrates the head 64 of the disk drive 30 moving from Track-1 to Track-2 in the vibrating operational environment. Particularly, line 810 illustrates that the head 64 is subjected to vibration while seeking and settling to Track-2.

Even though the head 64 is subjected to vibration, since the read caching algorithm was modified to eliminate the post-read operation 808, a read condition is still met such that the seek operation is complete and an on-track condition is declared at point 812. The modified read caching algorithm then performs a portion of the pre-read 814 on-track-2 and then further proceeds to read the desired data 818. Alternatively, it should be appreciated that after an on-track condition is declared at point 812, a write operation can be performed instead of a read operation. By utilizing the modified read caching algorithm, which eliminates the post-read operation, the head can still seek and settle to the second track even in the vibrating operational environment, without having to waste an additional rotation.

In summary the present invention may be regarded as a RMSD, e.g. a disk drive, that optimizes data transfer rates to and from the media even in a vibrating operational environment. The disk drive includes a moveable head, a cache memory and a microprocessor for controlling operations in the disk drive including seek operations and a read caching algorithm for read operations that include pre-read operations and post-read operations. The disk drive further includes a means for monitoring for the existence of a vibration state. If a vibration state is detected, the microprocessor of the disk drive under the control of a program estimates a read access time to the second track from the first track based on the vibration state, modifies the read caching algorithm based on the vibration state, and commands the moveable head to seek to the second track in order to optimize data transfer rates to and from the media even in the vibrating operational environment.

The process just discussed can be employed for disk drives with an embedded servo system. Numerous alternative methods for RMSDs with similar or other media format characteristics can be employed by those skilled in the art to use the invention with equal advantage to modify a read caching algorithm in order to optimize data transfer rates to and from the media even in a vibrating operational environment. Further, although the embodiments have been described in the context of a disk drive with embedded servo sectors, the invention can be employed in many different types of RMSDs having a head actuator scanning the media.

We claim:

1. In a rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, a method of efficiently switching between a read operation on the first track and either a read or write operation on the second track, the method comprising the steps of:

monitoring for the existence of a vibration state; and
if a vibration state is detected,
measuring the amount of vibration;
calculating an amount of post-read to be performed on the first track before seeking to the second track, the amount of post-read being dependent on the measured vibration; and
modifying the read caching algorithm based on the vibration state including adjusting the amount of post-read performed on the first track.

2. The method of claim 1, further comprising:
estimating a read access time to the second track based on the vibration state; and
seeking to the second track.

3. The method of claim 1, wherein the amount of post-read to be performed on the first track is inversely proportional to the measured vibration.

4. The method of claim 1, wherein modifying the read caching algorithm based on the vibration state comprises eliminating the post-read operation of the first track and immediately seeking to the second track.

5. The method of claim 1, wherein monitoring for the existence of a vibration state comprises measuring position error signal (PES) values.

6. The method of claim 1, wherein monitoring for the existence of a vibration state comprises monitoring for data read errors.

7. The method of claim 1, wherein monitoring for the existence of a vibration state comprises utilizing an acceleration sensor coupled to the RMSD.

8. In a rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, a method of efficiently switching between a read operation on the first track and either a read or write operation on the second track, the method comprising the steps of:

monitoring for the existence of a vibration state; and
if a vibration state is detected,
modifying the read caching algorithm based on the vibration state including:
eliminating the post-read operation of the first track;
immediately seeking to the second track; and
performing a portion of the pre-read operation on the second track.

9. The method of claim 8, wherein monitoring for the existence of a vibration state comprises measuring position error signal (PES) values.

10. The method of claim 8, wherein monitoring for the existence of a vibration state comprises monitoring for data read errors.

11. The method of claim 8, wherein monitoring for the existence of a vibration state comprises utilizing an acceleration sensor coupled to the RMSD.

12. In a rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, a method of efficiently switching between a read operation on the first track and either a read or write operation on the second track, the method comprising the steps of:

monitoring for the existence of a vibration state; and
if a vibration state is detected,
measuring the amount of vibration;
calculating an amount of post-read to be performed on the first track before seeking to the second track, the amount of post-read being dependent on the measured vibration;
estimating a read access time to the second track based on the vibration state; modifying the read caching algorithm based on the vibration state including adjusting the amount of post-read performed on the first track; and
seeking to the second track.

13. The method of claim 12, wherein the amount of post-read to be performed on the first track is inversely proportional to the measured vibration.

14. The method of claim 12, wherein modifying the read caching algorithm based on the vibration state comprises eliminating the post-read operation of the first track and immediately seeking to the second track.

15. The method of claim 12, wherein monitoring for the existence of a vibration state comprises measuring position error signal (PES) values.

16. The method of claim 12, wherein monitoring for the existence of a vibration state comprises monitoring for data read errors.

17. The method of claim 12, wherein monitoring for the existence of a vibration state comprises utilizing an acceleration sensor coupled to the disk drive.

18. In a rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, a method of efficiently switching between a read operation on the first track and either a read or write operation on the second track, the method comprising the steps of:

monitoring for the existence of a vibration state; and
if a vibration state is detected,
estimating a read access time to the second track based on the vibration state; and
modifying the read caching algorithm based on the vibration state including:
eliminating the post-read operation of the first track;
immediately seeking to the second track; and
performing a portion of the pre-read operation on the second track.

19. The method of claim 18, wherein monitoring for the existence of a vibration state comprises measuring position error signal (PES) values.

20. The method of claim 18, wherein monitoring for the existence of a vibration state comprises monitoring for data read errors.

21. The method of claim 18, wherein monitoring for the existence of a vibration state comprises utilizing an acceleration sensor coupled to the disk drive.

22. A rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, the RMSD further comprising:
a means for monitoring for the existence of a vibration state including the microprocessor receiving a value reflecting the amount of vibration; and
if a vibration state is detected, the microprocessor under the control of a program to:
calculate an amount of the post-read to be performed on the first track before seeking to the second track, the amount of post-read dependent on the measured vibration; and
modify the read caching algorithm based on the vibration state by adjusting the amount of post-read performed on the first track based on the vibration state.

23. The RMSD of claim 22, wherein the microprocessor further:
estimates a read access time to the second track based on the vibration state; and
commands the moveable head to seek to the second track.

24. The RMSD of claim 22, wherein the amount of post-read to be performed on the first track is inversely proportional to the measured vibration.

25. The RMSD of claim 22, wherein the microprocessor modifies the read caching algorithm based on the vibration state by eliminating the post-read operation of the first track and immediately commanding the moveable head to seek to the second track.

26. The RMSD of claim 22, wherein the microprocessor monitors for the existence of a vibration state by utilizing position error signal (PES) values.

27. The RMSD of claim 22, wherein the microprocessor monitors for the existence of a vibration state by monitoring for data read errors.

28. The RMSD of claim 22, wherein the means for monitoring for the existence of a vibration state comprises an acceleration sensor coupled to the RMSD, the microprocessor monitoring for the existence of a vibration state based upon output from the acceleration sensor.

29. A rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, the RMSD further comprising:
a means for monitoring for the existence of a vibration state; and if a vibration state is detected, the microprocessor under the control of a program to,
modify the read caching algorithm based on the vibration state including:
eliminating the post-read operation on the first track;
immediately commanding the moveable head to seek to the second track; and
commanding the moveable head to only perform a portion of the pre-read operation on the second track.

30. The RMSD of claim 29, wherein the microprocessor monitors for the existence of a vibration state by utilizing position error signal (PES) values.

31. The RMSD of claim 29, wherein the microprocessor monitors for the existence of a vibration state by monitoring for data read errors.

32. The RMSD of claim 29, wherein the means for monitoring for the existence of a vibration state comprises an acceleration sensor coupled to the RMSD, the microprocessor monitoring for the existence of a vibration state based upon output from the acceleration sensor.

33. A rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, the RMSD further comprising:
a means for monitoring for the existence of a vibration state; and
if a vibration state is detected, the microprocessor under the control of a program to:
receive a value reflecting the amount of vibration;
estimate a read access time to the second track based on the vibration state;
calculate an amount of post-read to be performed on the first track before seeking to the second track, the amount of post-read being dependent on the measured vibration;
modify the read caching algorithm based on the vibration state; and
command the moveable head to seek to the second track.

34. The RMSD of claim 33, wherein the microprocessor modifies the read caching algorithm by adjusting the amount of post-read performed on the first track based on the vibration state.

35. The RMSD of claim 33, wherein the amount of post-read to be performed on the first track is inversely proportional to the measured vibration.

36. The RMSD of claim 33, wherein the microprocessor modifies the read caching algorithm based on the vibration state by eliminating the post-read operation of the first track and immediately commanding the moveable head to seek to the second track.

37. The RMSD of claim 33, wherein the microprocessor monitors for the existence of a vibration state by utilizing position error signal (PES) values.

38. The RMSD of claim 33, wherein the microprocessor monitors for the existence of a vibration state by monitoring for data read errors.

39. The RMSD of claim 33, wherein the means for monitoring for the existence of a vibration state comprises an acceleration sensor coupled to the RMSD, the microprocessor monitoring for the existence of a vibration state based upon output from the acceleration sensor.

40. A rotating media storage device (RMSD) connectable to a host computer, the RMSD being subject to periods of sustained vibration causing a vibration state to exist and having a disk including at least a first track and a second track, a moveable head, a cache memory and a microprocessor for controlling operations in the RMSD including seek operations and a read caching algorithm for read operations that include pre-read operations and post-read operations, the RMSD further comprising:

a means for monitoring for the existence of a vibration state; and if a vibration state is detected, the microprocessor under the control of a program to:

estimate a read access time to the second track based on the vibration state and modify the read caching algorithm based on the vibration state including:

eliminating the post-read operation on the first track;

immediately commanding the moveable head to seek to the second track; and commanding the moveable head to only perform a portion of the pre-read operation on the second track.

41. The RMSD of claim 40, wherein the microprocessor monitors for the existence of a vibration state by utilizing position error signal (PES) values.

42. The RMSD of claim 40, wherein the microprocessor monitors for the existence of a vibration state by monitoring for data read errors.

43. The RMSD of claim 40, wherein the means for monitoring for the existence of a vibration state comprises an acceleration sensor coupled to the RMSD, the microprocessor monitoring for the existence of a vibration state based upon output from the acceleration sensor.

44. A computer system comprising a host computer and a rotating media storage device (RMSD), the RMSD being subject to periods of sustained vibration causing a vibration state to exist, the RMSD further comprising:

a disk including at least a first track and a second track;

a moveable head;

a cache memory;

a microprocessor for controlling operations in the RMSD including seek operations and a read caching algorithm for read operations that include pre-read operations and post-read operations;

a means for monitoring for the existence of a vibration state; and if a vibration state is detected, the microprocessor under the control of a program to:

receive a value reflecting the amount of vibration;

calculate an amount of post-read to be performed on the first track before seeking to the second track, the amount of post-read being dependent on the measured vibration; and modify the read caching algorithm based on the vibration state by adjusting the amount of post-read performed on the first track based on the vibration state.

45. The computer system of claim 44, wherein the microprocessor further: estimates a read access time to the second track based on the vibration state; and commands the moveable head to seek to the second track.

46. The computer system of claim 44, wherein the amount of post-read to be performed on the first track is inversely proportional to the measured vibration.

47. The computer system of claim 44, wherein the microprocessor modifies the read caching algorithm based on the vibration state by eliminating the post-read operation of the first track and immediately commanding the moveable head to seek to the second track.

48. A computer system comprising a host computer and a rotating media storage device (RMSD), the RMSD being subject to periods of sustained vibration causing a vibration state to exist, the RMSD further comprising:

a disk including at least a first track and a second track;

a moveable head;

a cache memory;

a microprocessor for controlling operations in the RMSD including seek operations and a read caching algorithm for read operations that include pre-read operations and post-read operations;

a means for monitoring for the existence of a vibration state; and if a vibration state is detected, the microprocessor under the control of a program to:

receive a value reflecting the amount of vibration;

estimate a read access time to the second track based on the vibration state;

calculate an amount of the post-read to be performed on the first track before seeking to the second track, the amount of post-read dependent on the measured vibration;

modify the read caching algorithm by adjusting the amount of post-read performed on the first track based on the vibration state; and command the moveable head to seek to the second track.

49. The computer system of claim 48, wherein the amount of post-read to be performed on the first track is inversely proportional to the measured vibration.

50. The computer system of claim 48, wherein the microprocessor modifies the read caching algorithm based on the vibration state by eliminating the post-read operation of the first track and immediately commanding the moveable head to seek to the second track.

* * * * *